Patented Mar. 20, 1934

1,951,992

UNITED STATES PATENT OFFICE 1,951,992

SEPARATION OF ACID GASES

Granville A. Perkins, South Charleston, W. Va., assignor to Carbide & Carbon Chemicals Corporation, a corporation of New York No Drawing. Application July 15, 1931
Serial No. 551,006

14 Claims. (Cl. 23—2)

In the purification of gases, it is frequently desirable to remove a constituent of acidic properties, such as carbon dioxide, sulphur dioxide, or hydrogen sulphide. In other cases an acidic gas is itself the valuable constituent in a gas mixture, and it is desirable to concentrate or isolate it. The present invention is a process wherein a gas mixture containing an acidic constituent is treated with an absorbent therefor, the absorbent being subsequently regenerated and the absorbed material recovered if desired. The invention comprises, as its principal novel feature, the application of a group of absorbents not heretofore used for this purpose; and it provides a simple, efficient and economical method of effecting the desired separation, all as more fully hereinafter described.

In practicing my invention, a gas mixture containing an acidic constituent is brought into contact with an amine containing more atoms of carbon than of nitrogen in its molecule, and belonging to the group of such compounds which can be formed by the interaction of ethylene dichloride with ammonia followed by liberation of free amine by treatment with caustic.

The absorbing media of my process, in general, are either open chain compounds of the general formula $NH_2.C_2H_4.(C_2H_4.NH)_x.NH_2$, where $x$ is a whole number, or ring compounds having the general formula $$\lceil -(C_2H_4.NH)_x.C_2H_4.NH-\rceil$$

where $x$ is a whole number. The first group is exemplified by diethylene triamine $$(NH_2.C_2H_4.NH.C_2H_4.NH_2),$$

triethylene tetramine $$(NH_2.C_2H_4.NH.C_2H_4.NH.C_2H_4.NH_2)$$

and tetraethylene pentamine $$(NH_2.C_2H_4.NH.C_2H_4.NH.C_2H_4.NH.C_2H_4.NH_2);$$

examples of the second group are diethylene diamine

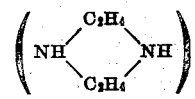

and triethylene triamine

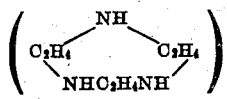

I have found that these substances, boiling at about 200° to 300° C., have low vapor pressures and are otherwise well adapted for use as acid gas absorbents. They may be used in anhydrous form, but absorption is facilitated by the addition of water, approximately equal weights of amine and water forming a convenient solution.

In practicing my invention, the gaseous mixture from which the acid gases are to be separated is passed into intimate contact with an absorbent consisting of one or more of the substances described above, or a water solution of these substances. Any suitable method of effecting contact between the gaseous mixture and the absorbent may be used, a counter-current flow of the gases and the absorbing medium being preferred. For this purpose any of the known types of gas scrubbing equipment are satisfactory, such as packed, tray-containing or spray-type scrubbing towers. By suitable contact of the gases with the scrubbing medium, practically all of the acid gaseous constituents may be removed.

In order to recover the absorbed gases and to regenerate the absorbent for further use, the absorbent may be heated, for example, to a temperature of about 100° C. or somewhat higher. In those cases in which sulfur dioxide is the absorbed gas, this treatment may not entirely eliminate the gas from the absorbent, but the regeneration will be sufficiently complete to produce a useful and active absorbent. In general, the presence of water in the scrubbing medium is necessary to effect a satisfactory regeneration of the solution. During the regeneration of the absorbent and the elimination of the absorbed gases, I prefer to return any evolved water vapor to the solution by means of a reflux condenser. The amines which I use as absorbing media possess vapor pressures at the temperatures of regeneration which are low enough to preclude serious losses of material from this source.

Other means of separating the absorbed gases from the absorbent, such as warming and aerating the solution may be used. The invention is not limited to absorbents prepared by the interaction of ethylene dichloride and ammonia, but includes the substances embraced by the appended claims when prepared by any means.

I claim:—

1. A process for separating acid gases from gaseous mixtures, which includes contacting said gaseous mixture with an absorbent comprising at least one amine containing more atoms of carbon than of nitrogen in its molecule, and belonging to the group of such compounds which can be formed by the interaction of ethylene dichloride with ammonia followed by liberation of the free amine by treatment with caustic, and thereafter treating said absorbent to separate the absorbed gases therefrom.

2. A process for separating acid gases from gaseous mixtures, which includes contacting said gaseous mixture with an absorbent comprising an aqueous solution of at least one amine containing more atoms of carbon than of nitrogen in its molecule, and belonging to the group of such compounds which can be formed by the interaction of ethylene dichloride with ammonia followed by liberation of the free amine by treatment with caustic, and thereafter treating said absorbent to separate the absorbed gases therefrom.

3. A process for separating acid gases from gaseous mixtures, which includes contacting said gaseous mixture with an absorbent comprising approximately equal weights of water and at least one amine containing more atoms of carbon than of nitrogen in its molecule, and belonging to the group of such compounds which can be formed by the interaction of ethylene dichloride with ammonia followed by liberation of the free amine by treatment with caustic, and thereafter treating said absorbent to separate the absorbed gases therefrom.

4. A process for separating acid gases from gaseous mixtures, which includes contacting said gaseous mixture with an absorbent comprising at least one amine containing more atoms of carbon than of nitrogen in its molecule, and belonging to the group of such compounds which can be formed by the interaction of ethylene dichloride with ammonia followed by liberation of the free amine by treatment with caustic, and thereafter heating said absorbent to separate the absorbed gases therefrom.

5. A process for separating acid gases from gaseous mixtures, which includes contacting said gaseous mixture with an absorbent comprising an aqueous solution of at least one amine containing more atoms of carbon that of nitrogen in its molecule, and belonging to the group of such compounds which can be formed by the interaction of ethylene dichloride with ammonia followed by liberation of the free amine by treatment with caustic, and thereafter heating said absorbent to separate the absorbed gases therefrom.

6. A process for separating acid gases from gaseous mixtures, which includes contacting said gaseous mixture with an absorbent comprising approximately equal weights of water and at least one amine containing more atoms of carbon than of nitrogen in its molecule, and belonging to the group of such compounds which can be formed by the interaction of ethylene dichloride with ammonia followed by liberation of the free amine by treatment with caustic, and thereafter heating said absorbent to above about 100° C. to separate the absorbed gases therefrom.

7. A process for separating acid gases from gaseous mixtures, which includes contacting said gaseous mixture with an absorbent comprising at least one compound of the group having the general formula $$NH_2.C_2H_4.(C_2H_4.NH)_x.NH_2,$$

where $x$ represents a whole number, and thereafter treating said absorbent to separate the absorbed gases therefrom.

8. A process for separating acid gases from gaseous mixtures, which include contacting said gaseous mixture with an absorbent comprising an aqueous solution of at least one compound of the group having the general formula $$NH_2.C_2H_4.(C_2H_4.NH)_x.NH_2,$$

where $x$ represents a whole number, and thereafter treating said absorbent to separate the absorbed gases therefrom.

9. A process for separating acid gases from gaseous mixtures, which includes contacting said gaseous mixture with an absorbent comprising an aqueous solution of at least one compound of the group having the general formula $$NH_2.C_2H_4.(C_2H_4.NH)_x.NH_2,$$

where $x$ represents a whole number, and thereafter heating said absorbent to separate the absorbed gases therefrom.

10. A process for separating acid gases from gaseous mixtures, which includes contacting said gaseous mixture with an absorbent comprising an aqueous solution of at least one compound of the group having the general formula $$NH_2.C_2H_4.(C_2H_4.NH)_x.NH_2,$$

where $x$ represents a whole number, and thereafter heating said absorbent to a temperature above about 100° C. to separate the absorbed gases therefrom.

11. A process for separating acid gases from gaseous mixtures, which includes contacting said gaseous mixture with an absorbent comprising at least one compound of the group having the general formula $$[-(C_2H_4.NH)_x.C_2H_4.NH-]$$

where $x$ represents a whole number and thereafter treating said absorbent to separate the absorbed gases therefrom.

12. A process for separating acid gases from gaseous mixtures, which includes contacting said gaseous mixture with an absorbent comprising an aqueous solution of at least one compound of the group having the general formula $$[-(C_2H_4.NH)_x.C_2H_4.NH-]$$

where $x$ represents a whole number, and thereafter treating said absorbent to separate the absorbed gases therefrom.

13. A process for separating acid gases from gaseous mixtures, which includes contacting said gaseous mixture with an absorbent comprising an aqueous solution of at least one compound of the group having the general formula $$[-(C_2H_4.NH)_x.C_2H_4.NH-]$$

where $x$ represents a whole number, and thereafter heating said absorbent to separate the absorbed gases therefrom.

14. A process for separating acid gases from gaseous mixtures, which includes contacting said gaseous mixture with an absorbent comprising an aqueous solution of at least one compound of the group having the general formula $$[-(C_2H_4.NH)_x.C_2H_4.NH-]$$

where $x$ represents a whole number, and thereafter heating said absorbent to a temperature above about 100° C. to separate the absorbed gases therefrom.

GRANVILLE A. PERKINS.